Figure 1:
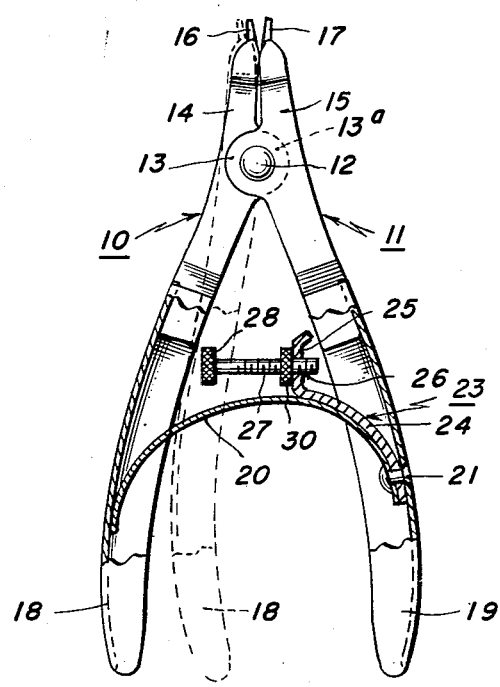

May 21, 1957 H. WURZEL 2,792,622
CIRCULAR SPRING REMOVING TOOL
Filed March 16, 1954

INVENTOR
HUGO WURZEL,
BY
ATTORNEY

United States Patent Office 2,792,622
Patented May 21, 1957

2,792,622

CIRCULAR SPRING REMOVING TOOL

Hugo Wurzel, Bronx, N. Y., assignor to Waldes Kohinoor, Inc., Long Island City, N. Y., a corporation of New York Application March 16, 1954, Serial No. 416,489

1 Claim. (Cl. 29—229)

This invention relates to improvements in pliers and more particularly to an improved pliers for handling open-ended spring retaining rings.

As is well known, retaining rings are widely used in providing artificial shoulders on shafts or in housing bores. Such rings conventionally have the form of an open-ended ring body made from spring metal, the external ring being spread over a shaft-end and moved axially therealong to the plane of its groove, whereupon it is released to seat with spring pressure against the groove bottom, and the internal ring being contracted to an external diameter such that it may be inserted in the housing bore to the location of its groove, being thereupon released to seat against the groove bottom. Usually, retaining rings functioning as aforesaid are provided at their free ends with lugs having apertures for the reception of the tips of plier-like tools (known in the art as "pliers" or "field pliers") by which the rings may be spread or contracted in their assembly, as aforesaid.

In handling retaining rings with pliers, care must be taken that the ring is not over-spread or over-contracted as such may result in the ring taking on a permanent set or even breaking. This is particularly true with external rings, because, unless the pliers for handling same are provided with positive means for limiting the spreading of their tips, it is difficult to avoid the rings being over-spread, with consequent impairment of the ring. While with internal rings the danger of their being over-contracted is not as great, because usually the ring ends abut before any substantial over-contraction can take place, nevertheless there are certain types of internal rings wherein even the small amount of contraction resulting in the ring ends touching one another is not permissible.

Heretofore, the means employed to limit the spreading or contraction of the plier tips, thereby to avoid the undesirable over-spreading or over-contraction of the retaining rings as aforesaid, was of the general type disclosed in application of Fred H. Steyer, Serial No. 355,971, filed May 19, 1953. Briefly, such means comprises a U-shaped bracket, mounting a projecting adjusting screw, affixed to and extending transversely from the plier jaws. While effective to limit movement of the jaws, continuing experience has shown that such limiting means were objectionable in certain respects. For example, the projecting bracket rendered the tool awkward to handle and in appearance, and hampered the operator in various ways. Moreover, since the bracket and adjusting screw added substantial width to the tip end of the pliers, such precluded their use in assemblies characterized by small available plier space and/or by substantial distance from end of shaft to groove location. In the case of internal rings, the extension of the bracket and its adjusting screw precluded insertion of the tip into the housing bore.

Accordingly, it is an important object of the present invention to improve pliers of the type employed in handling retaining rings, as respects their jaw- and tip-movement limiting means in simple, practical and thoroughly dependable manner.

Another object of the invention is the provision of a pliers for handling retaining rings incorporating means for limiting movement of its tips which is disposed wholly within its handle structure, thereby making such pliers easy to handle and extending their application while at the same time improving the overall appearance of the pliers.

A more particular object of the invention is the provision of a tip-movement limiting means for pliers of the type employed to handle retaining rings and which are conventionally provided in the handle structure thereof with spring means for biasing the tips to a normal position, wherein the limiting and spring means are capable of being installed together and affixed to the handle structure by the same fastening means.

Figure 2:
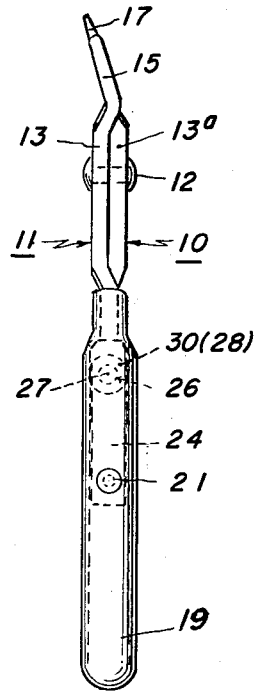

The above and other objects and features not specifically outlined in the foregoing characterizing the improved pliers of this invention will be seen from the following detailed description thereof, reference being had to the accompanying drawing illustrating a specific example, wherein:

Fig. 1 is a broken-away, part-sectional, plan view of the improved pliers and tip-movement limiting means according to the invention; and Fig. 2 is a side view thereof.

Referring to the drawings, the pliers illustrated are of the type adapted to handle external retaining rings and accordingly comprise a pair of generally parallel and elongated arms 10 and 11 pivotally connected to one another intermediate their ends by a rivet 12 having bearing in the mutually offset hub portions 13, 13a with which said arms are provided adjacent their tip ends. The arms to one side of said pivotal connection are shaped as jaws 14, 15, which terminate at their free ends in pointed tips 16, 17 of size adapting them to be inserted into the apertures conventionally provided in the free ends of the retaining rings. As seen in full lines in Fig. 2, the tips may be inclined out of the plane of the arms, to facilitate their cooperation with the retaining ring apertures, but the tips may also extend straight.

To the other side of their pivotal connection the arms 10 and 11 are formed and shaped so as to provide oppositely curved handles 18, 19 which are normally maintained in spread relation by spring means reactive therebetween. Illustratively, said means comprises a bowed leaf spring 20 affixed at one end to one handle 19 as by a rivet 21, with its other end being free of but bearing against the other handle 18. Preferably, the handle ends 18, 19 of the plier arms have channel sections and they are arranged so that the channels face one another. Thus, the ends of the leaf spring may be effectively housed within the handle channels, as by affixing the secured end against the bottom of the channel of handle 19, and disposing the other end so that it may slide on the bottom of the channel of handle 18.

It will be understood that in a pliers as illustrated the handles are normally spread by the spring 20, thus to relate the tips 16, 17 in close proximity, i. e. spaced apart the slight distance corresponding to the spacing of the retaining ring apertures when the ring is in its unstressed state, and that consequent to compression of the handles the tips are spread so as to correspondingly spread the ring as required in assembling it in the groove of a shaft or equivalent machine part. The same general plier construction may be adapted to the handling of internal retaining rings requiring contraction in their assembly by pivotally connecting the plier arms 10, 11 in crossed relation rather than in parallel relation as shown. In the crossed-arm form of pliers, the leaf spring 20 maintains the tips 16, 17 in normally spread relation, and compression of the handles 18, 19 results in the tips moving towards one another to contract the ring.

According to the invention, special means are provided for limiting compression of the handles, and hence spreading of the tips (in case of the pliers being designed for external rings) or contraction of the tips (in case of the pliers being designed for internal rings). Such means preferably comprises a finger or bracket 23 made from strap metal of width slightly less than the width of a handle channel so as to be comfortably accommodated therein, and which is shaped to provide a curved portion 24 and a straight portion 25. Preferably, one end of the curved portion 24 is affixed to the bottom of the channel of the same handle 19 to which the leaf spring 20 is attached so that the bracket as a whole extends into and is contained within the space between the handles; such disposing the straight portion 25 generally parallel to the longitudinal center line of the pliers. Said straight portion is provided with a threaded hole or eye 26, into which is threaded the shank of an adjusting screw 27 arranged generally transversely of the pliers and with its head 28 disposed in the path of movement of but normally spaced from the other handle 18. Preferably, the diameter of the screw head is slightly less than the width of the channel of said handle 18, so as to pass freely thereinto and engage against the channel bottom as said handle moves towards the companion handle 19 upon the handles being compressed.

From the above, it will be clear that by threading the adjusting screw 27 into or backing it off from the straight portion 25 of the bracket 23 the spacing between the handle 18 and the screw head 28 may be varied at will, thus to variably limit the closing movement of the handles and the opening (or closing) movement of the tips 16, 17. To lock the adjusting screw 27 in a desired position of adjustment, it preferably mounts a lock nut 30 which, when turned tight against the inner face of the straight portion 25 of the bracket 23, secures the screw against accidental or unintentional turning.

As seen in Fig. 1, the curvature of the curved portion of the bracket 23 corresponds substantially to the normal bowing of the leaf spring 20 when installed. Accordingly, said spring is reinforced to a degree by the bracket and it also receives substantial protection therefrom from forces or objects which might otherwise tend to impair or dislodge it.

According to a further feature of the invention, the same rivet 21 which is employed to secure the leaf spring 20 is also employed to secure the bracket 23 to the handle 19. Such results in simplified manufacture, as compared to prior forms of pliers in which the spring for normally spreading the handles and the tip-movement limiting means were separately installed, and it also makes for a sturdy and reliable tool. It is also possible to further simplify installation of the spring and limiting means by securing them together as a sub-assembly unit and thereupon installing them as one by means of the rivet 21 as aforesaid.

Without further analysis, it will be seen that a pliers provided with tip-movement limiting means as herein proposed is not only easy to manufacture but also it may be manufactured very economically, without detracting from its accuracy and reliability in use. Moreover, since the limiting means is effectively contained within the space between the plier handles rather than projecting laterally from the plier structure, pliers according to the invention are less awkward and cumbersome than known pliers serving similar function and, since their lateral dimension is not increased, they may be used effectively in retaining ring application in which, through space limitation, earlier pliers, particularly those mounting the limiting means adjacent the tips, could not be used at all.

As many changes could be made in carrying out the above constructions without departing from the scope of the invention, it is intended that all matter contained in the above description or shown in the accompanying drawings shall be interpreted as illustrative and not in a limiting sense.

I claim:

A pliers for handling open-ended spring retaining rings comprising a pair of arms pivotally connected to one another intermediate their ends, the end portions of said arms to one side of the pivotal connection forming jaws which terminate at their free ends in pointed tips adapted to be inserted in apertures provided in the free ends of said retaining rings, the arms to the other side of the pivotal connection providing handles for moving said tips relatively of one another and having oppositely facing channel-sections, means for adjustably limiting the angular movement of said handles towards one another comprising a finger affixed at one end to the bottom of the channel of one handle adjacent the outer end thereof and curving inwardly therefrom into the space between said handles, an adjusting screw having a head and being threadedly mounted in the other end of the finger, said screw extending transversely between said handles and being disposed with its head adjacent to but normally spaced from said other handle and serving as a motion-limiting stop therefor, a bowed leaf spring also having one end affixed to the bottom of the channel of said one handle and its free end extending to and bearing with spring pressure against the bottom of the channel of said other handle and biasing said handles to spaced relation, and a common fastening means affixing said one end of the finger and said one end of the leaf spring to said one handle, the curvature of the finger corresponding substantially to the normal bowing of the leaf spring whereby the finger provides a backing for the fixed end portion of said leaf spring.

References Cited in the file of this patent

UNITED STATES PATENTS

| | | |
|---|---|---|
| 1,117,026 | Gathright | Nov. 10, 1914 |
| 1,319,007 | Kind | Oct. 14, 1919 |
| 1,500,004 | Sedivec | July 1, 1924 |
| 1,691,161 | Miller | Nov. 13, 1928 |

FOREIGN PATENTS

| | | |
|---|---|---|
| 525,160 | France | May 28, 1921 |